(12) United States Patent
Aasness

(10) Patent No.: US 10,631,684 B2
(45) Date of Patent: Apr. 28, 2020

(54) SPLATTER SCREEN

(71) Applicant: Progressive International Corporation, Kent, WA (US)

(72) Inventor: Kyle Aasness, Athens, GA (US)

(73) Assignee: Progressive International Corporation, Kent, WA (US)

( * ) Notice: Subject to any disclaimer, the term of this patent is extended or adjusted under 35 U.S.C. 154(b) by 421 days.

(21) Appl. No.: 15/498,208

(22) Filed: Apr. 26, 2017

(65) Prior Publication Data

US 2017/0325628 A1    Nov. 16, 2017

Related U.S. Application Data (60) Provisional application No. 62/336,842, filed on May 16, 2016.

(51) Int. Cl.
*A47J 36/06* (2006.01)
*A47J 37/10* (2006.01)

(52) U.S. Cl.
CPC .......... *A47J 36/06* (2013.01); *A47J 37/101* (2013.01)

(58) Field of Classification Search
None
See application file for complete search history.

(56) References Cited

U.S. PATENT DOCUMENTS

| | | | | |
|---|---|---|---|---|
| 6,056,146 A | * | 5/2000 | Varakian | A47J 37/108 126/299 C |
| 2014/0246437 A1 | * | 9/2014 | Lee | A47J 37/101 220/370 |
| 2015/0069078 A1 | * | 3/2015 | Hawker | A47J 37/106 220/810 |
| 2015/0104555 A1 | * | 4/2015 | Huttner | A47J 37/101 426/438 |
| 2015/0272384 A1 | * | 10/2015 | Ferron | A47J 36/06 220/201 |

FOREIGN PATENT DOCUMENTS

| | | | |
|---|---|---|---|
| CN | 203106836 | * | 8/2013 |
| CN | 203106836 U | * | 8/2013 |
| DE | 20 2012 101 559 | * | 8/2012 |
| WO | WO-2004004524 A1 | * | 1/2004 ............ A47J 36/06 |

* cited by examiner

*Primary Examiner* — Ibrahime A Abraham
*Assistant Examiner* — Elizabeth M Sims
(74) *Attorney, Agent, or Firm* — Lowe Graham Jones PLLC (57) ABSTRACT

A splatter screen includes a splatter screen frame and a mesh secured to the frame. A handle is mounted to the frame for pivotal movement so that it is positionable between a collapsed position for storage and an extended position for grasping. The handle includes a handle base, enabling the screen to rest upright on a countertop and to be supported by the handle base and the frame.

9 Claims, 7 Drawing Sheets

SPLATTER SCREEN

PRIORITY CLAIM

This application claims the benefit of U.S. provisional application No. 62/336,842, filed May 16, 2016, the contents of which are incorporated by reference.

FIELD OF THE INVENTION

This application relates generally to devices for covering pots or pans to reduce splatters.

BACKGROUND OF THE INVENTION

A splatter screen is a commonly used device for covering a pan during the course of cooking, in which food items within the pan may splatter. The screen can, for example, prevent hot oil or other hot liquids from splattering onto a person while cooking, and can limit the amount of splattering generally around a cooktop and surrounding surfaces. At the same time, the splatter screen allows steam and air to freely pass through. Existing splatter screens, however, tend to have long handles that add to their bulk and make them challenging to store, and are unable to stand upright in a way that will prevent liquids from dripping from the screen and onto a countertop.

SUMMARY OF THE INVENTION

A preferred splatter screen in accordance with the invention includes a splatter screen frame and a mesh or other screen material secured to the frame. A handle is mounted to the splatter screen frame, preferably such that the handle is substantially within the perimeter defined by the frame. In a preferred implementation, the handle is pivotally attached to the frame so that it can be selectively positionable between a collapsed position for storage and an extended position for grasping. In one version, one or more feet are mounted to the screen to enable the screen to rest upright on a countertop.

A splatter screen preferably comprises a peripheral frame supporting an interior screen panel, the interior screen panel being positioned within the area defined by the peripheral frame and defining a screen plane. A handle is supported by the frame, the handle having a grip spaced apart from the interior screen panel, the handle further having a handle base. The splatter screen is supportable on a horizontal surface by a combination of the handle base and the peripheral frame, the screen plane extending upwardly at an angle of greater than 45 degrees and less than or equal to 90 degrees with respect to the horizontal surface when the splatter screen is supported on the horizontal surface by the handle base and the peripheral frame.

The splatter screen handle may be supported by the frame for pivotal movement between a deployed position extending away from the interior screen panel and a stowed position relatively adjacent the interior screen panel.

The handle may also be mounted to the peripheral frame at a first location and a second location, the first location being diametrically opposite the second location.

In some versions, a first mount is attached to the frame at the first location and a second mount is attached to the frame at the second location, the handle being pivotally attached to the first mount and the second mount, and further wherein the grip is positioned adjacent the second mount.

The frame may comprise one or more feet extending away from the interior screen panel, wherein the splatter screen is supportable on the horizontal surface by the feet and the handle base when the handle is in the deployed position.

The lower handle mount may be formed with a first channel, the first channel receiving a portion of the handle to retain the handle in the deployed position.

The lower handle mount may also have a side channel, the side channel receiving a portion of the handle to retain the handle in the stowed position.

The handle may further include a linear portion between the grip and the peripheral frame.

In some versions, the linear portion abuts the interior screen panel, the linear portion further extending between the center of the screen panel and the peripheral frame.

The linear portion may also have a plurality of teeth positioned to contact the interior screen panel when the handle is in the deployed position.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
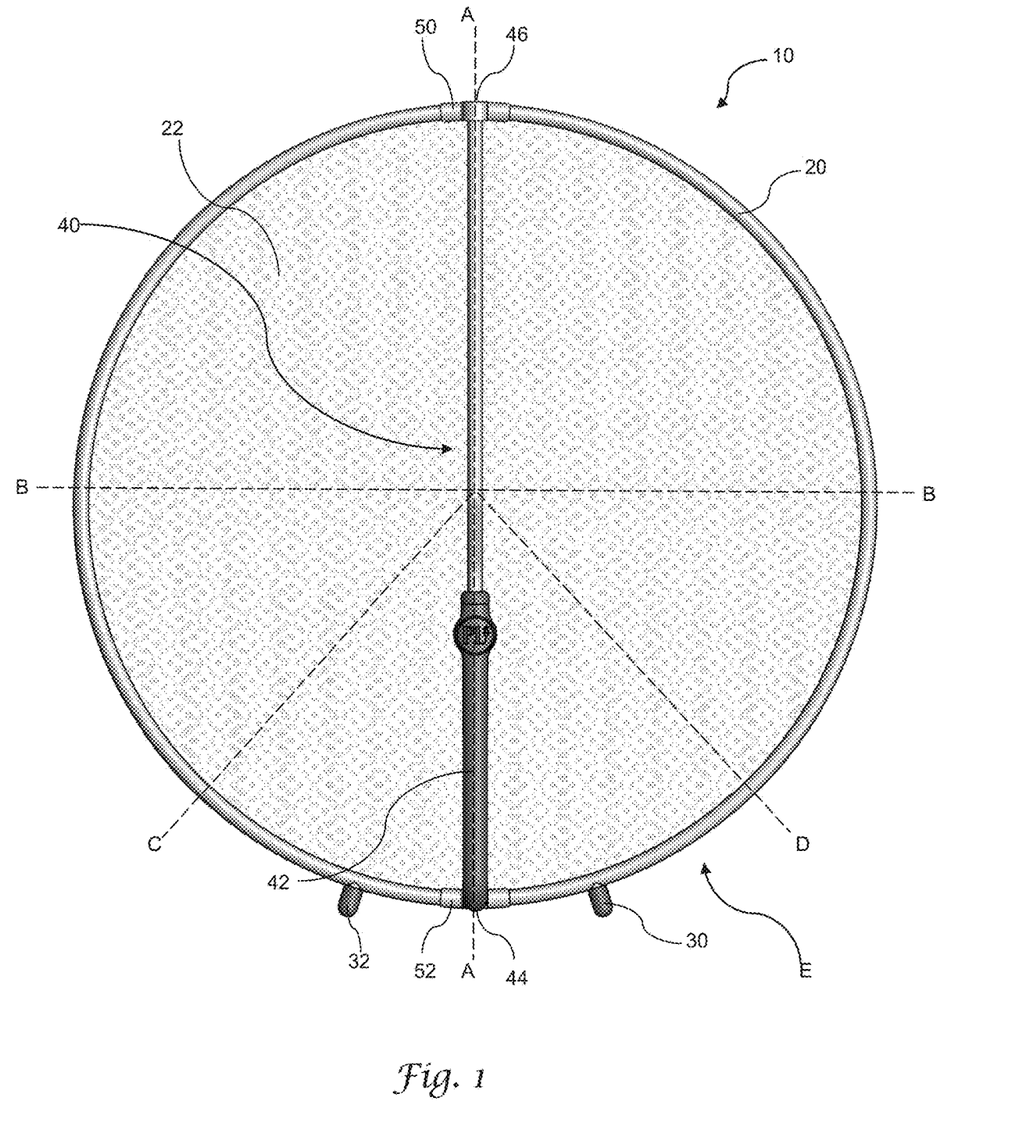
FIG. 1 is a front elevational view of a preferred splatter screen.

With reference to FIG. 1, a preferred splatter screen 10 in accordance with the invention includes a frame 20 supporting an interior screen panel 22. In the preferred example, the frame 20 is generally circular in shape, thereby defining a circular peripheral boundary. In other versions of the invention the frame may have other shapes, such as having scalloped edges. Most preferably, the frame is formed from a stainless steel wire, although other material may be used. In the illustrated example, the frame defines the outer boundary of the splatter screen. In other versions, additional structural or other frame members may be provided at an interior of the outer frame member, such as internal cross members or concentric ring frame members.

The screen panel 22 is preferably formed from a stainless steel wire mesh, and in the illustrated example the wire mesh extends across and fills the entire interior of the perimeter defined by the frame. In other versions, the screen may be formed from a solid material such as a thin sheet metal, which is then perforated with holes arranged to allow air to flow through the screen but to impede the flow of splattering hot liquids through the screen. Most preferably, the wire mesh is permanently affixed to the frame, such as by welding or other methods. Alternatively, the frame 20 may be formed from steel sheet stock material formed into a C-shaped cross section such that the open portion of the C-shape faces toward the interior of the frame. The mesh material is then inserted into the opening and the frame is crimped down about the mesh to lock the mesh within the frame.

Figure 8:
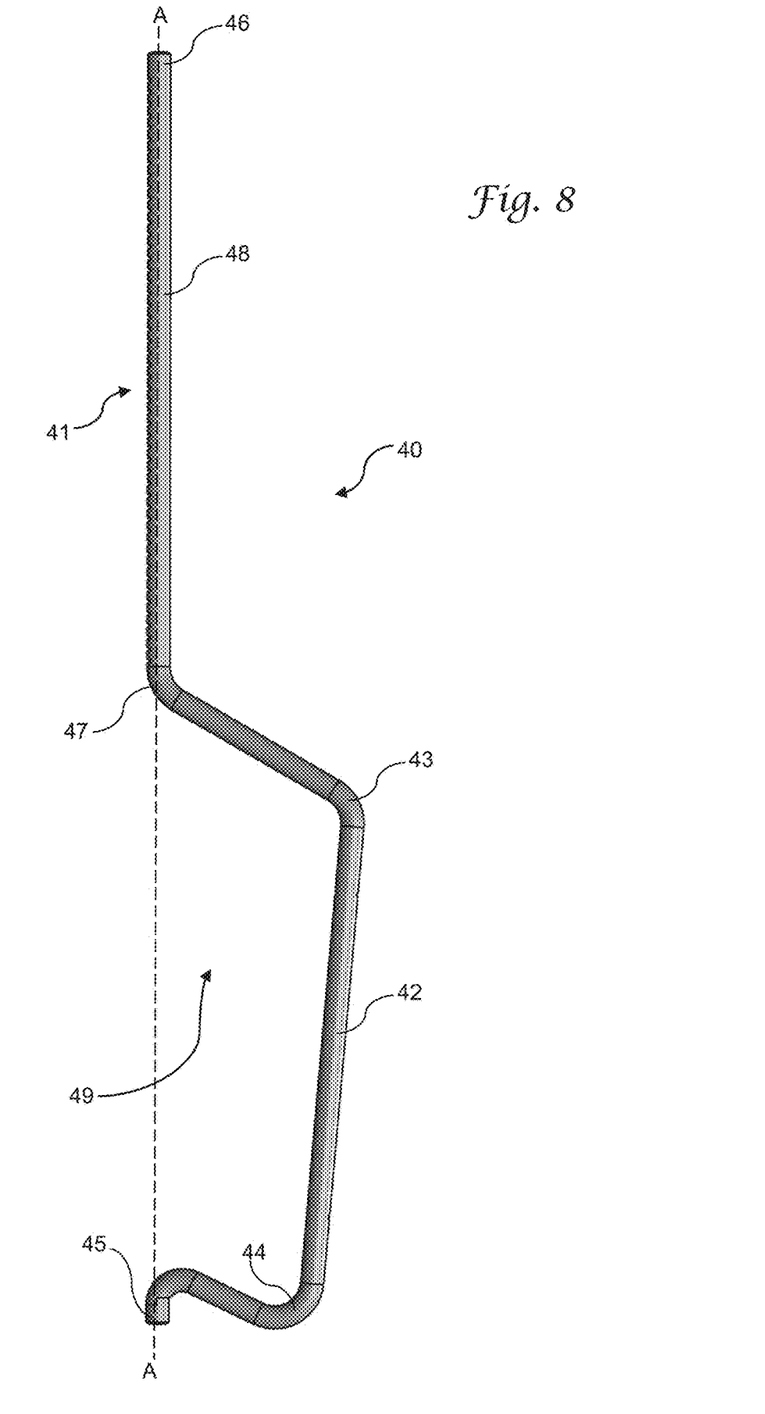
FIG. 8 is a side view of a preferred handle for a splatter screen.

A handle 40 is secured to the splatter screen 10, and in the illustrated example the handle is pivotally mounted to the frame. As best seen in FIG. 8, the handle is preferably formed from stainless steel wire that is bent at various locations to form a handle that is suitable for both grasping when in use, and storage when not in use. The handle includes a first end 45 and an opposing second end 46, and in the illustrated version the first and second ends extend in opposite directions linearly away from one another along handle axis A-A.

The handle 40 includes a grip 42, in which the grip is offset from the pivotal handle axis A-A. In one version, the grip 42 is formed by bending the stainless steel wire forming the handle, for example at a first bend 44, a second bend 43, and a third bend 47, so that the grip forms a C-shape configured within the handle and extending away from the handle axis. In other versions, the grip may be otherwise formed or shaped, or may be formed from different materials. In either case, the grip 42 is preferably positioned radially outward from the handle axis A-A, providing a gap 49 between the handle axis and the handle grip 42 such that the gap is sized to receive the hand of a user in the area defined by the gap.

As seen in FIG. 1, the handle base, or first bend 44, is within the footprint defined by the handle frame 20, which includes the feet 30, 32. Most preferably the handle base is within the area bounded by the circular frame portion when viewing the splatter screen at a position perpendicularly to the screen plane, as in FIG. 1. In some versions, the handle base may extend slightly beyond the boundary of the circular frame portion, but remains within the boundary which includes the feet. In other words, the radial distance from the center of the splatter screen portion to the farthest tip of the frame, or feet, is less than the radial distance to the farthest tip of the handle base.

In accordance with a preferred version, the second end 46 of the handle is elongated, extending along the handle axis for the majority of the length of the handle axis. In the illustrated example, the elongated second end is formed as a linear section or portion 48 having one or more indentations or teeth 41 along a side of the elongated linear section that is diametrically opposite the grip. The teeth may comprise a plurality of teeth extending substantially along the entire length of the linear section. In other versions, the teeth extend along only a part of the linear section. As seen in FIG. 1, in the illustrated example the linear portion extends from the center of the screen panel (as indicated by the intersection of axes A-A and B-B) to a perimeter of the splatter screen, defined by the frame.

Figure 7:
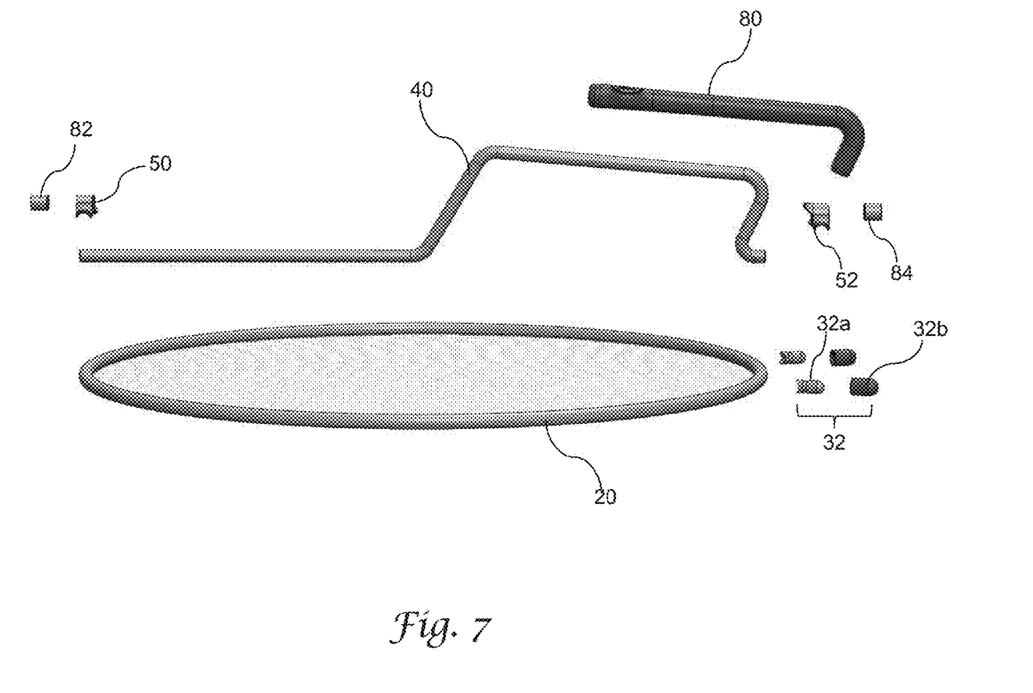
FIG. 7 is an exploded view of a preferred splatter screen.

A pair of endcaps may be attached to the handle, including a first endcap 84 attached to the first end of the handle, and a second endcap 82 attached to the second end of the handle, as seen in the exploded view of FIG. 7. The endcaps (or the first and second ends of the handle, if no endcaps are used) are trapped within a pair of clamps 50, 52. In the illustrated example, the clamps are formed from stainless steel and are welded to the frame 20 to provide a secure mount for the handle to the frame. Most preferably the clamps are attached at a first upper location and a second lower location positioned diametrically opposite the first location. The configuration allows the handle to pivot within the clamps, and therefore to pivot with respect to the frame.

In the illustrated example, the clamps are secured to diametrically opposite locations on the perimeter of the frame, as shown in FIG. 1. In other versions, the clamps may be attached to other frame members, such as interior cross members. In yet other examples, the handle may be otherwise attached, though preferably in a fashion that allows for pivotal movement of the handle with respect to the screen.

In one version in which the grip is formed on a wire handle, the grip may include a resilient and heat resistant covering, such as a silicone material forming grip cover 80 (see the exploded view of FIG. 7).

Figure 2:
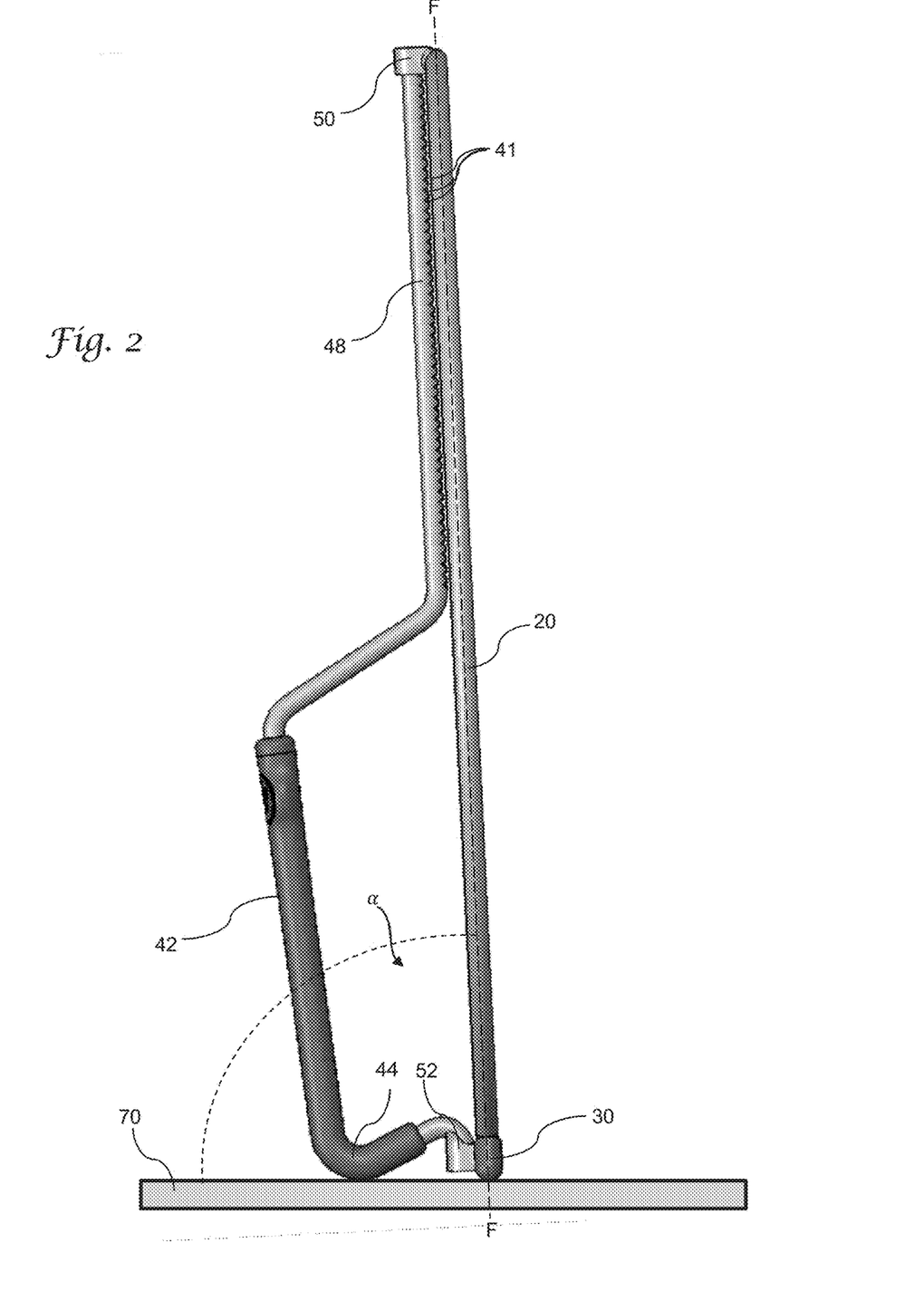
FIG. 2 is a left side elevational view of a preferred splatter screen, shown on a horizontal surface.
Figure 3:
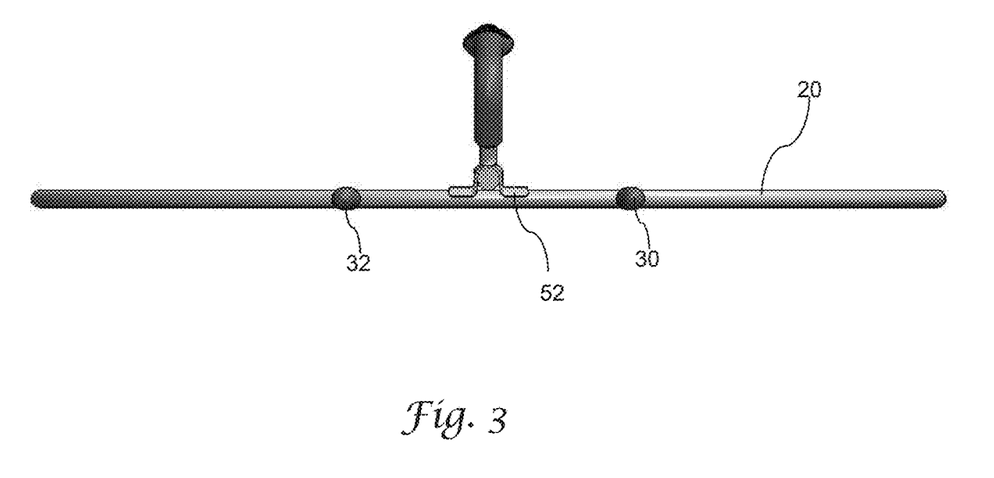
FIG. 3 is a top plan view of a preferred splatter screen.

When the handle is deployed the splatter screen is supportable on a horizontal surface such as illustrated in FIG. 2, in which a portion of the handle and a portion of the frame support the upwardly-extending splatter screen on the surface such as a countertop. In one version, the peripheral frame is circular in shape and a portion of the circular frame contacts the horizontal surface. In other versions, the frame in the vicinity of the grip includes a projection, a flattened portion, or another feature to facilitate the support of the splatter screen on a horizontal surface, so that the screen will extend upwardly in such a position. In one version of the splatter screen, the frame further includes one or more feet forming part of the frame, and in the illustrated version two feet 30, 32 are provided. The feet may be formed from stainless steel which is welded to the frame, then covered by a resilient foot cap, such as in stainless steel foot 32a and foot cap 32b, as shown in the exploded view of FIG. 7.

With reference to FIG. 1, the feet are preferably located on a common lower half of the splatter screen, such as the lower half of the screen as divided by diameter B-B in FIG. 1. Most preferably, the feet are attached to and extend away from a common quadrant of the screen such as quadrant E defined by radials C and D in FIG. 1. As illustrated, the linear handle axis of the handle 40 bisects the quadrant E, such that in the preferred example a first foot 30 and second foot 32 are located in symmetrically opposing positions along the frame with respect to the handle and therefore with respect to the handle axis A-A.

Figure 5:
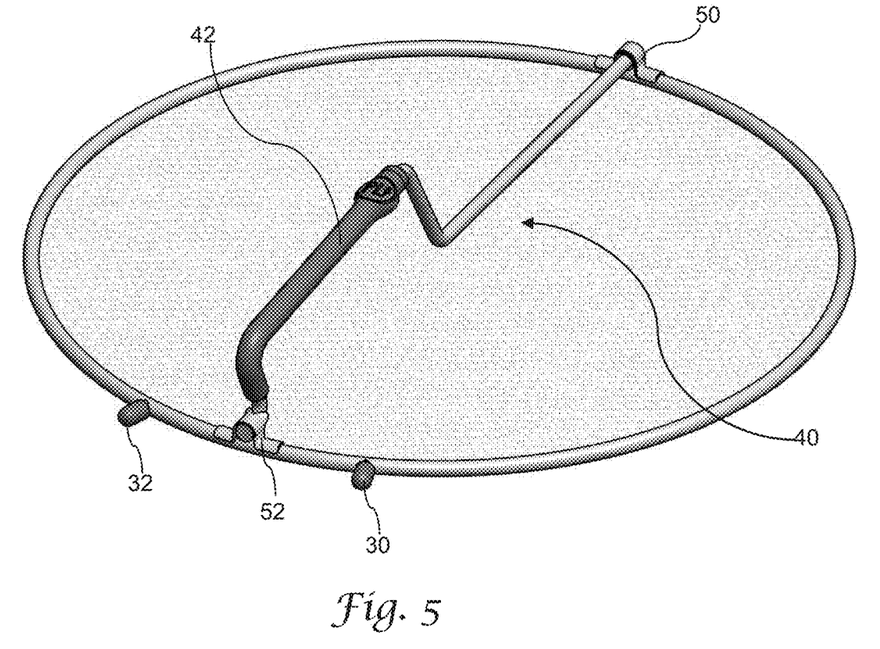
FIG. 5 is a bottom perspective view of a preferred splatter screen, shown with a handle in an extended position.
Figure 6:
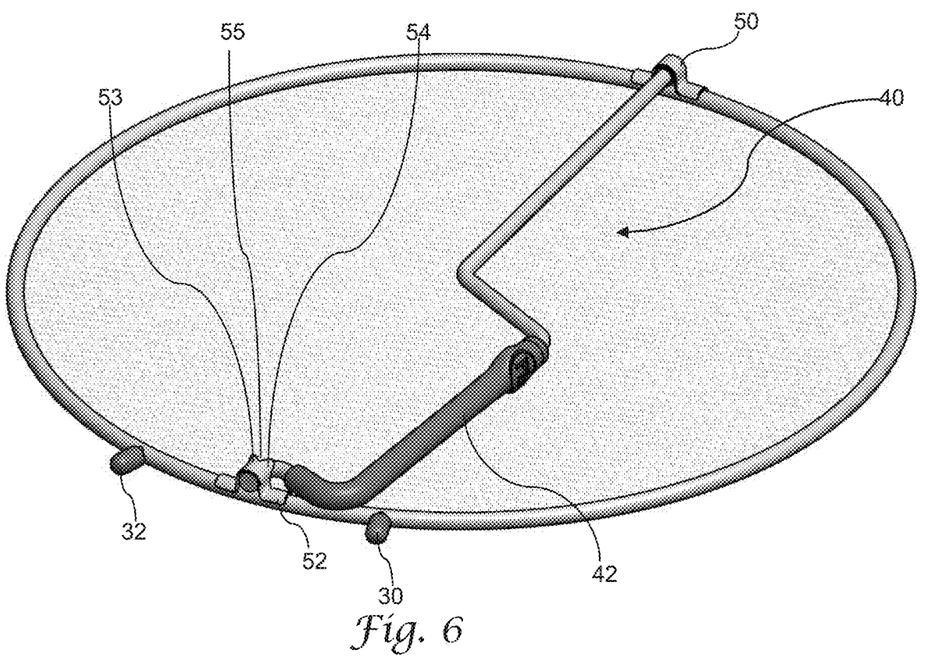
FIG. 6 is a bottom perspective view of a preferred splatter screen, shown with a handle in a stowed position.

The handle is secured to the splatter screen, and preferably the frame, so that it is configurable between a stowed position as illustrated in FIG. 6, in which the handle is relatively closely adjacent the frame or the screen. Most preferably, the handle folds flat so that it rests against the screen or frame in the stowed position of FIG. 6. The handle is also positionable in an extended position as seen in FIG. 5, in which the handle is rotated away from the screen to facilitate grasping of the handle by a user. Most preferably, the handle is pivotable through a range of 90 degrees between the stowed and extended positions, and in one preferred version the handle grip may move to a stowed position in which the handle grip is moved toward the first foot 30, as seen in FIG. 6, as well as to another stowed position rotated 180 degrees toward the second foot 32.

Figure 4:
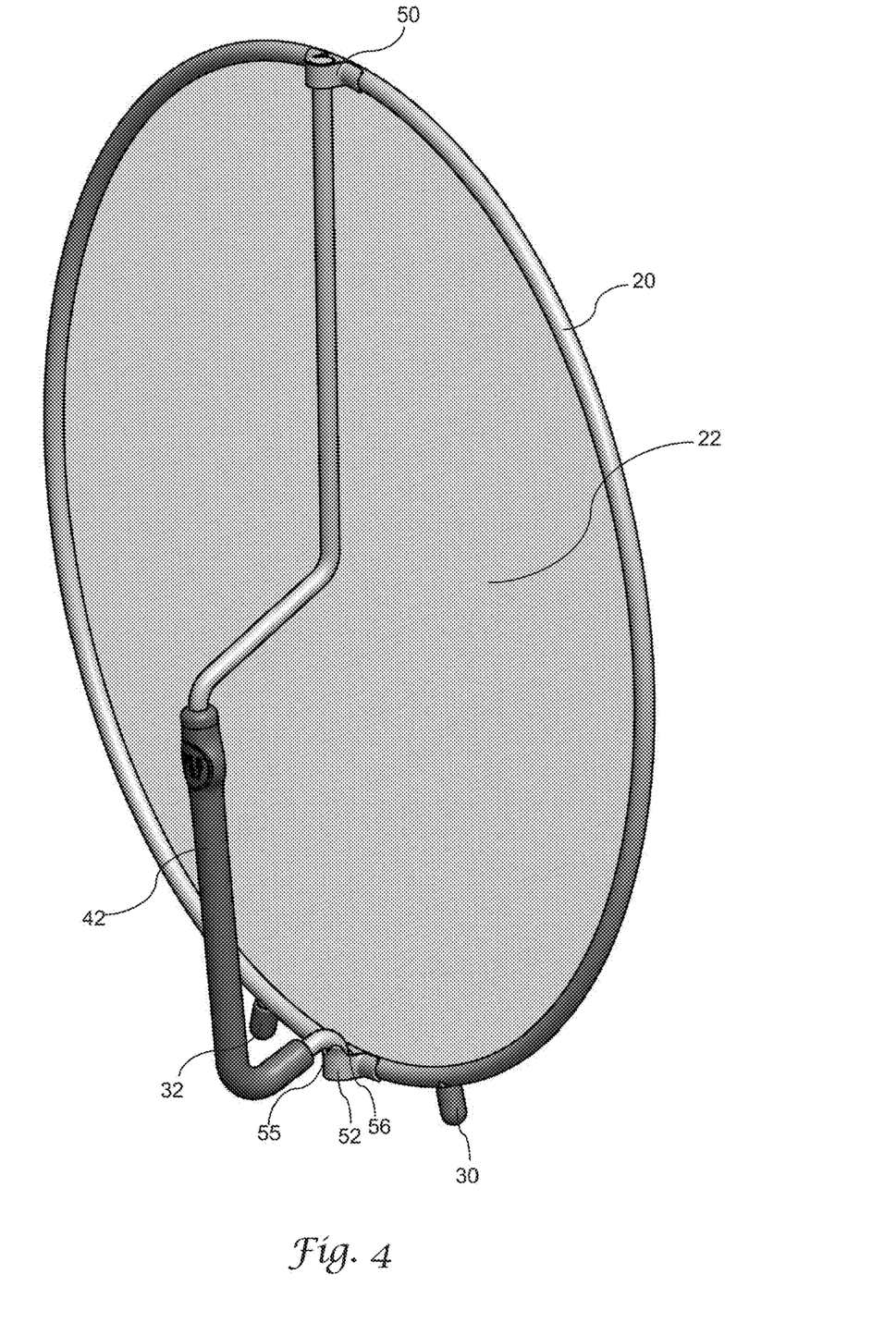
FIG. 4 is a rear perspective view of a preferred splatter screen.

One or both of the clamps 50, 52 may further be formed with features for retaining the handle in the stowed and extended positions. Thus, in one version, a first clamp 52 includes a pair of projections 53, 54 forming a central channel 55 between them, as best seen in FIG. 6, and a side channel, e.g. 56 as best seen in FIG. 4, on either side of them, in which the channels are sized and shaped to receive the wire forming the handle. In the deployed position such as in FIG. 5, a portion of the wire forming the handle is received within the central channel defined between the pair of projections, creating a frictional fit which requires a force applied to the handle to dislodge the handle from the channel in order to move it to the stowed position. Likewise, in the stowed position such as in FIG. 6 the handle wire is received and retained within a corresponding side channel, requiring application of a rotational force to dislodge the wire of the handle and rotate it into the extended position.

With the handle rotated to the deployed or extended position, such as illustrated in FIG. 4, the feet and a lower portion of the handle enable the splatter screen to rest on a horizontal surface 70, as illustrated in FIG. 2. Thus, in one version, the handle grip includes a lower portion or handle base 44, which in the illustrated example corresponds to a lower bend of the wire forming the handle. The lower portion of the handle and each of the two feet provide a stable surface for the splatter screen on the horizontal surface, so that the splatter screen may extend upright when resting on the surface, in which the screen plane F-F is transverse to the horizontal plane of the horizontal surface 70. Most preferably, the feet and handle are configured so that the screen plane F-F (see FIG. 2), defined by the plane of the screen material within the frame, forms an angle α that is greater than 45 degrees with respect to the horizontal surface 70, and more preferably at least 75 degrees or at least 80 degrees, but which is also less than or equal to 90 degrees so that the splatter screen frame and mesh material will lean slightly toward the handle when resting on the horizontal surface.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims.

The embodiments of the invention in which an exclusive property or privilege is claimed are defined as follows:

1. A splatter screen, comprising:
   a peripheral frame supporting an interior screen panel, the interior screen panel filling the area defined by the peripheral frame and defining a screen plane; and
   a handle supported by the frame for pivotal movement between a deployed position in which the handle extends away from the interior screen panel and a stowed position in which the handle is relatively adjacent the interior screen panel, the handle having a grip spaced apart from the interior screen panel when the handle is in the deployed position, the handle further having a handle base;
   the handle further being mounted for pivotal movement about a handle axis, the handle axis extending diametrically across the peripheral frame;
   wherein when the handle is in the deployed position the splatter screen is supportable on a horizontal surface by the handle base and the peripheral frame, the screen plane extending transversely to the horizontal surface and extending upwardly away from the handle base when the splatter screen is supported on the horizontal surface;
   wherein the handle is mounted to the peripheral frame at a first location and a second location, the first location being diametrically opposite the second location.

2. The splatter screen of claim 1, further comprising an upper mount positioned on the frame and a lower mount positioned on the frame, the handle being pivotally attached to the upper mount and the lower mount, and further wherein the grip is positioned adjacent the lower mount.

3. The splatter screen of claim 2, wherein the frame comprises a plurality of feet extending away from the interior screen panel, wherein the splatter screen is supportable on the horizontal surface by each of the plurality of feet and the handle base when the handle is in the deployed position.

4. The splatter screen of claim 3, wherein the lower mount comprises a central channel, the central channel receiving a portion of the handle to retain the handle in the deployed position.

5. The splatter screen of claim 4, wherein the lower mount comprises a side channel, the side channel receiving a portion of the handle to retain the handle in the stowed position.

6. The splatter screen of claim 1, wherein the handle further comprises a linear portion between the grip and the peripheral frame.

7. The splatter screen of claim 6, wherein the linear portion abuts the interior screen panel.

8. The splatter screen of claim 7, wherein the linear portion further comprises a plurality of teeth positioned to contact the interior screen panel when the handle is in the deployed position.

9. The splatter screen of claim 1, wherein screen plane is supported at an angle of greater than 45 degrees and less than 90 degrees with respect to the horizontal surface when the splatter screen is supported on the horizontal surface by the handle base and the peripheral frame.

* * * * *